(No Model.) 3 Sheets—Sheet 1.

N. A. DULL & A. H. MOORE.
TILTING GATE.

No. 487,179. Patented Nov. 29, 1892.

Witnesses
C. S. Frye
Thomas E. Turpin

N. A. Dull
A. H. Moore
Inventors.

By
W. J. Fitzgerald and Co.,
Attorneys.

(No Model.) 3 Sheets—Sheet 3.

N. A. DULL & A. H. MOORE.
TILTING GATE.

No. 487,179. Patented Nov. 29, 1892.

Witnesses
C. S. Frye.
Thomas E. Turpin

Inventors:
N. A. Dull
and
A. H. Moore,
By W. T. Fitz Gerald & Co.
Attorneys

UNITED STATES PATENT OFFICE.

NEWTON A. DULL AND ANDREW HARRY MOORE, OF SANTA FÉ, MISSOURI.

TILTING GATE.

SPECIFICATION forming part of Letters Patent No. 487,179, dated November 29, 1892.

Application filed December 22, 1891. Renewed October 18, 1892. Serial No. 449,296. (No model.)

*To all whom it may concern:*

Be it known that we, NEWTON A. DULL and ANDREW HARRY MOORE, citizens of the United States, residing at Santa Fé, in the county of Monroe and State of Missouri, have invented certain new and useful Improvements in Tilting Gates; and we do hereby declare the following to be a full, clear, and exact description of the invention, such as will enable others skilled in the art to which it appertains to make and use the same.

Our invention has relation to improvements in tilting gates; and it has for its object, among other things, to provide such a gate of a cheap, simple, and durable construction, embodying devices whereby it may be opened and closed with but little effort.

To the attainment of the foregoing and other ends the invention consists in the peculiar construction, certain novel combinations, and the adaptation of parts hereinafter described and claimed.

Figure 1:
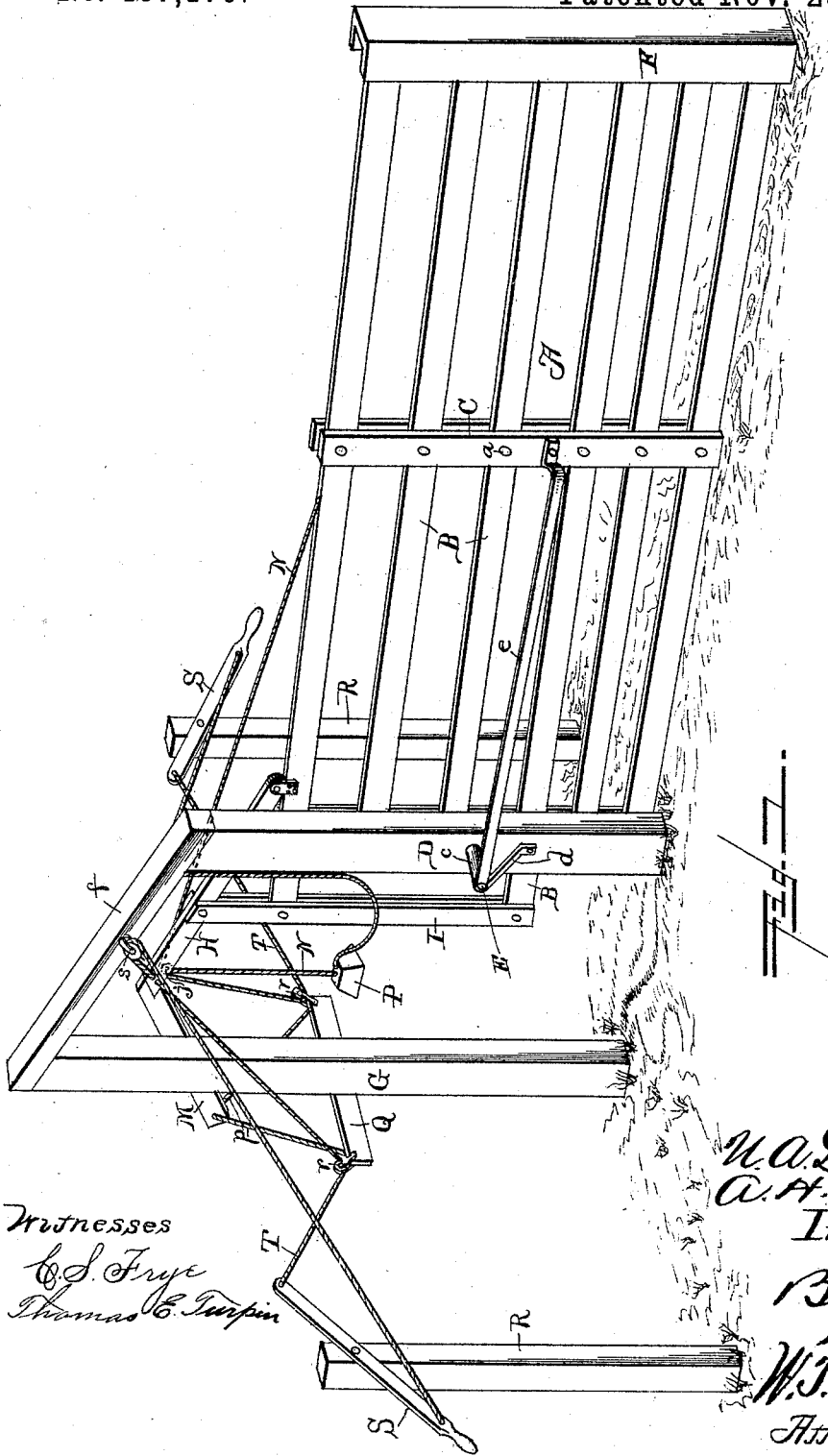
Figure 2:
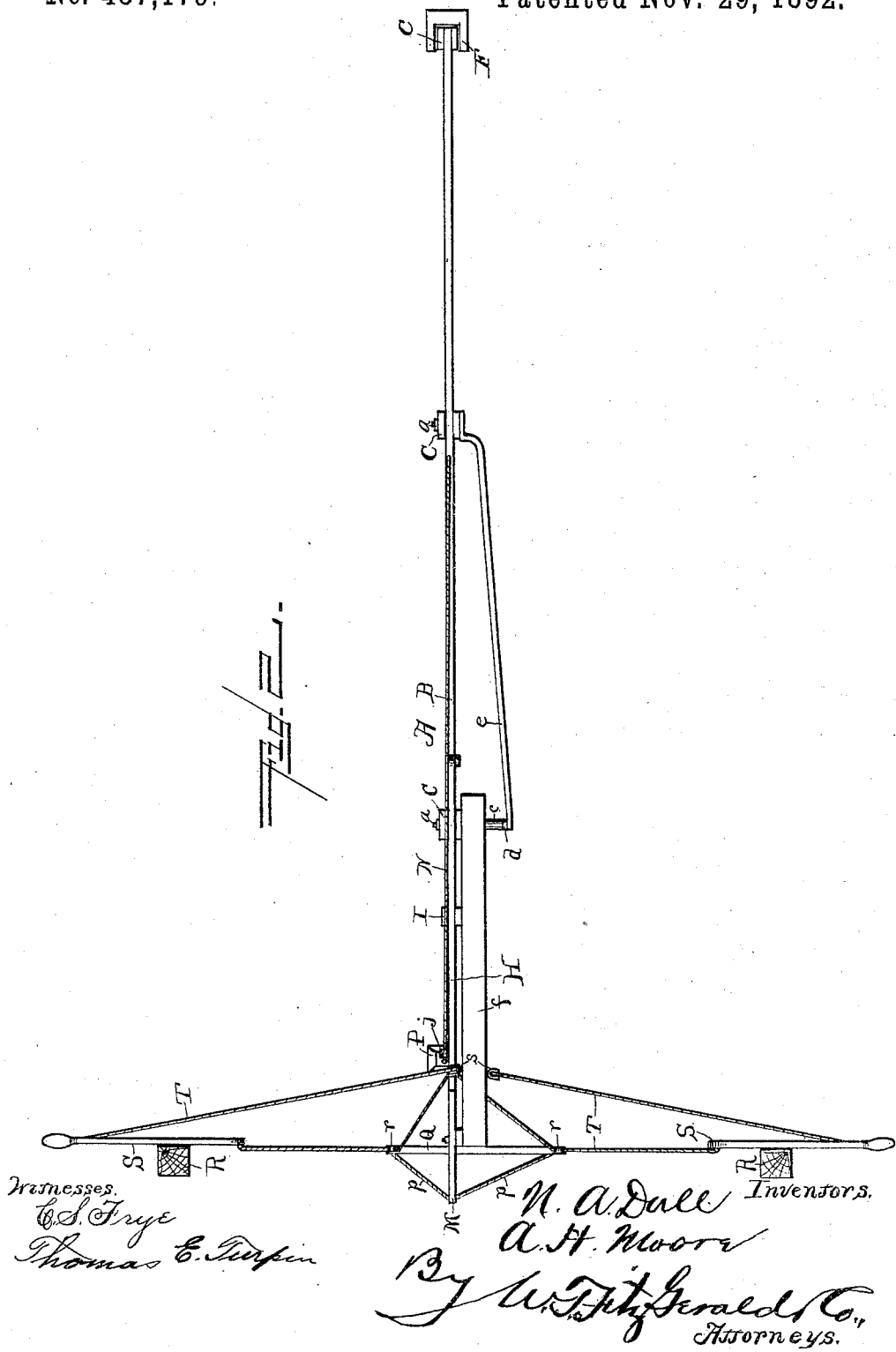
Figure 3:
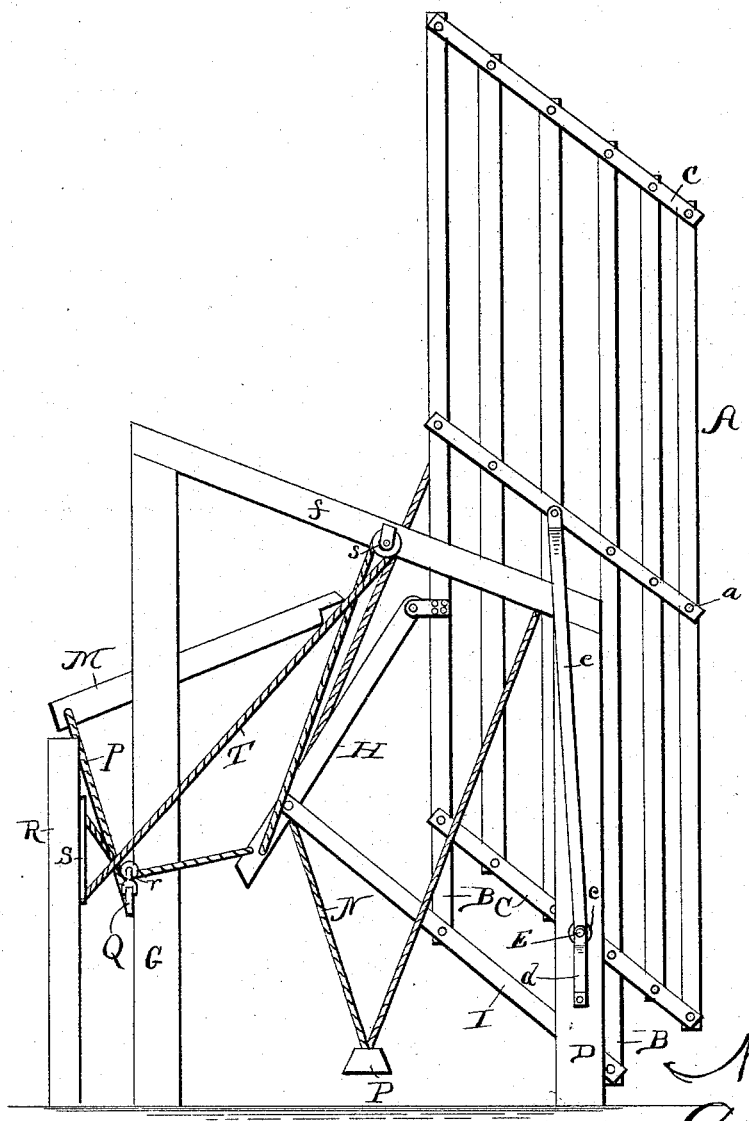

In the accompanying drawings, Figure 1 is a perspective view of our improved gate in a closed position. Fig. 2 is a plan view of the same; and Fig. 3 is a side elevation of the gate upon a reduced scale, the same being shown in its open position.

Referring by letter to the said drawings, A indicates our improved tilting gate, which comprises the longitudinal bars B and the upright bars C, which latter rest on either side of the longitudinal bars and are flexibly connected thereto by transverse bolts $a$, tubular sleeves being preferably placed on said bolts, so as to form bearing-boxes for the longitudinal bars for obvious reasons. Taking transversely through the inner upright bars C, near the middle thereof, and through the upright supporting-post D of the gate is a bolt E, which serves pivotally to connect the inner end of the gate to the said upright post.

Surrounding the bolt E, which extends laterally from the side of the post D opposite to the side to which the gate is connected, is a sleeve $c$, which is braced by a bracket-arm $d$, connected at its lower end to the post D, and pivotally connected to the outer end of the bolt E is one end of a bracing-arm $e$, which is connected at its forward end to one of the intermediate upright bars C and serves to steady the gate and hold the same in its normal vertical plane.

F indicates the keeper-post of our improved gate, which is longitudinally slotted on its inner side, as illustrated, to adapt it to receive and hold the forward uprights of the gate and prevent lateral play of the same.

Fixedly connected to the upper end of the supporting-post D and extending rearwardly therefrom is a frame-bar $f$, which is connected at its rear end to an upright frame-post G, which is preferably arranged in the same vertical plane as the posts F and D.

Pivotally connected to the upper edge of the top bar of the gate A, adjacent to the rear end thereof, as illustrated, is a lever-arm H, which has its rear end beveled, as shown, and is pivoted between upright bars I, which bars in turn are pivotally connected to two of the longitudinal bars B of the gate, which are extended rearwardly from the rear upright bars C, as shown.

Pivotally connected to or fulcrumed upon the frame-post or upright G at a suitable elevation is the latch-lever M, which has its forward end notched, as shown, and is designed to engage the beveled end of the lever-arm H and hold the gate in its closed position until the same is opened, as presently set forth.

Fixedly connected at one end to the frame-bar $f$, adjacent to the forward end thereof, is a cord or rope N, which takes around a pulley $j$, mounted on the lever-arm H, and is connected at its opposite end to the upper ends of the intermediate uprights C or other suitable part of the gate.

Connected to the rope or cord N between the pulley $j$ and the frame-bar $f$ is a counterbalance-weight P, which serves in practice to facilitate the opening of the gate and to prevent the gate from falling violently to the ground when closed.

Pivotally connected to the frame-post G at a point beneath the latch-lever M is a lever Q, which rests in a plane at right angles to that of the latch-lever M and has its ends connected with the rear end of said latch-lever by cords $p$ for a purpose presently described.

R indicates posts which are situated at suitable points on opposite sides of the gate and serve to support hand-levers S, through the medium of which the gate is actuated, as will be presently described.

Connected at one end to the levers S, adjacent to the upper ends thereof, are cords or cables T, which take, respectively, around pulleys r, connected to the ends of the lever Q, and are connected to the rear end of the lever-arm H, and then take around pulleys s, connected to the frame-bar f, and are connected at their opposite ends to the hand-levers, as illustrated. By this construction and arrangement of parts it will be readily perceived that a great leverage is afforded, whereby the gate may be opened and closed by the exercise of but little effort.

In operation it will be seen that by moving the lower end of the hand-levers toward the gate the latch-lever M will be disengaged from the lever H, when the gate will be pulled into an upright position, the counterbalance-weight assisting such movement. As the gate swings into its upright position it will be readily seen that by reason of the pivotal connection of the longitudinal bars B and the upright bars C the said bars B will fold against each other, whereby the width of the gate will be decreased and that of the gateway increased.

When it is desired to lower the gate to its closed position, the lower ends of the hand-levers are pulled away from the gate, when through the medium of the ropes T the inner end of the gate will be raised and the outer end lowered, when the lever H will press the forward end of the latch-lever M upwardly until its rear beveled end takes into the notch in the forward end of said latch-lever, when the gate will be locked in its closed position.

Although we have specifically described the construction and relative arrangement of the several elements of our improved gate, yet we do not desire to be confined to such precise construction, as such modifications may be made as fairly fall within the scope of our invention.

Having thus described our invention, what we claim, and desire to secure by Letters Patent, is—

1. In a tilting gate, the combination, with the supporting-post, the gate pivotally connected thereto and having the rearwardly-extending longitudinal bars, the upright bars pivotally connected to the ends of the extended bars, and the lever-arm pivotally connected at one end to the top longitudinal bar and at an intermediate point in its length to the upright bars, of the cord or rope connected at one end to the gate and passed around a pulley on the lever-arm and connected at its opposite end to the supporting-post, a counterbalance-weight connected to the cord or rope at a point intermediate the lever-arm and the supporting-post, and a suitable means for opening and closing the gate, substantially as specified.

2. In a tilting gate, the combination, with the supporting-post, the frame-post, the frame-bar connecting the supporting and frame posts, the gate pivotally connected to the supporting-post and having the rearwardly-extended longitudinal bars, the upright bars connected to the ends of the extended bars, and the lever-arm pivotally connected at one end to the top longitudinal bar and at an intermediate point in its length to the upright bars, of the latch-lever fulcrumed on the frame-post and adapted to engage the rear end of the lever-arm, the lever Q, fulcrumed on the frame-post beneath the latch-lever and resting at right angles thereto, cords connecting the ends of the lever Q and the rear end of the latch-lever, the hand-levers, and cords or ropes connected at one end to said hand-levers at one side of the fulcrumed points thereof and taking around pulleys on the lever Q, connected to the lever-arm, taking around the pulleys connected to the frame-bar, and connected at their opposite ends to the hand-levers, substantially as and for the purpose set forth.

3. In a tilting gate, the combination, with the supporting-post, the frame-post, the frame-bar connecting said posts, the gate pivotally connected to the supporting-post and having the rearwardly-extended longitudinal bars, the upright bars pivotally connected to the ends of the extended bars, and the lever-arm pivotally connected at one end to the top longitudinal bar and at an intermediate point in its length to the upright bars, of the latch-lever fulcrumed upon the frame-post and adapted automatically to engage the lever-arm of the gate to lock the same and a suitable means for opening and closing the gate and actuating the latch-lever, substantially as specified.

In testimony whereof we affix our signatures in presence of two witnesses.

NEWTON A. DULL.
ANDREW HARRY MOORE.

Witnesses:
J. R. SMILEY,
J. D. POWER.